March 20, 1951        J. J. KUEHN        2,545,960
REEL DRIVE MECHANISM FOR MOTION-PICTURE PROJECTORS
Filed Dec. 7, 1945
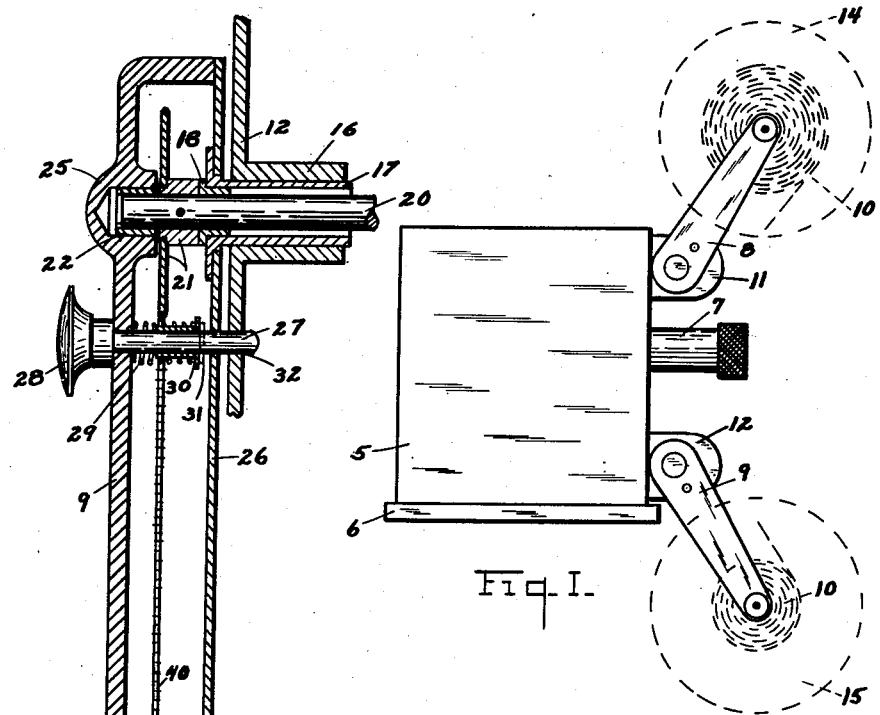
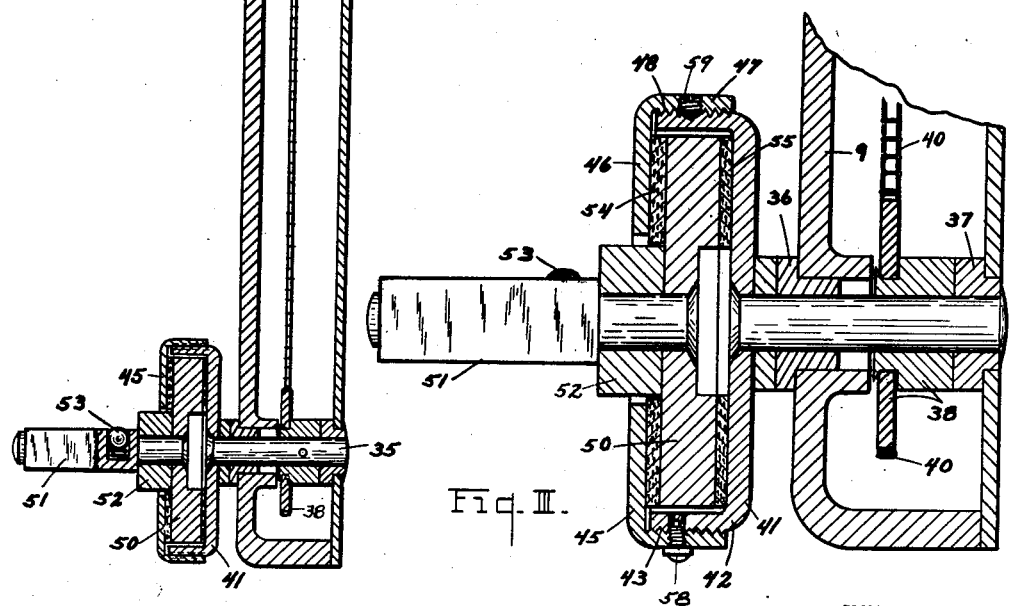
INVENTOR.
JOHN J. KUEHN.
BY
Joseph B. Lindecker.

Patented Mar. 20, 1951

2,545,960

UNITED STATES PATENT OFFICE 2,545,960

REEL DRIVE MECHANISM FOR MOTION-PICTURE PROJECTORS

John J. Kuehn, Chicago, Ill., assignor, by mesne assignments, to Illinois Watch Case Co., Elgin, Ill., a corporation of Illinois Application December 7, 1945, Serial No. 633,297

1 Claim. (Cl. 64—30)

This invention relates to motion picture apparatus and more particularly to the film reel driving mechanism of motion picture projectors although not limited to this use alone.

In the conventional motion picture machines or projectors the film is positively driven by the mechanism of the machine and is drawn from a roll on the feed reel thereof and wound upon a take-up reel which is driven by the mechanism of the machine by suitable yielding means, said means or mechanism accommodating for the slowing up of the take-up reel as the film roll thereon increases in diameter. The conventional yielding take-up driving mechanism provides a substantially constant power of the driven or take-up reel member with the result that the take-up tension on the film undesirably decreases as the diameter of the film roll on the take-up reel increases.

The primary object of the invention is to provide means whereby the power of the driven or take-up reel member is automatically varied as the diameter of the roll film on the take-up reel increases with corresponding decrease in speed of the take-up reel.

Another object of the invention is to provide a film reel drive mechanism in which the frictional engagement between the driving means and the driven means will automatically be varied depending upon the diameter of the film leaving the feeding reel and tension of the film being wound upon the take-up or storing reel.

Still another object is to provide a mechanism in which the increased frictional engagement between the driving means and the driven means will automatically be returned to a normal frictional engagement when the tension of the film is changed.

A further object is to provide a housing to enclose the driving means and the driven means whereby a fluid may be contained therein to keep the frictional surfaces of the discs properly lubricated to permit the slip-friction desired when the load represented by the driven element is gradually or suddenly imposed on the driving element.

A still further object of the invention is to provide a take-up drive mechanism which is more positive in its operation than a belt drive depending upon the slip of said belt.

A still further object is to provide power-transmitting couplings permitting the frictional engagement of the driving and driven means to vary, said couplings to be free of spring members or other tension devices which need adjustment from time to time due to extensive use thereof.

Other and further objects will be suggested to those skilled in the art by the description which follows and finally embodied in the appended claim.

The invention will be better understood from the following description taken in connection with the accompanying drawings, in which:

Figure 1 is a side view of a projector which is constructed in accordance with and which illustrates a preferred embodiment of the invention, parts of the projector not being shown.

Figure 2 is a sectional view of the arm supporting the take-up reel showing the driving mechanism and friction couplings.

Figure 3 is an enlarged sectional view of the housing enclosing the friction discs as shown in Figure 2.

Inasmuch as the invention relates particularly to the means for driving the storing reel for the film, the accompanying drawings show only as much of the entire projector as will be of assistance in apprehending the invention.

Like characters of reference indicate like parts in the several views.

Referring to the drawing, 5 designates the body of the machine, with base 6, lens mount 7, said body or housing having supporting brackets 11 and 12 for pivotally supporting arms 8 and 9 for mounting reels for film 10 as usual in a machine of this type.

The feeding reel is designated 14 and the take-up reel is designated 15.

Referring to Figure 2, the supporting bracket 12 is formed with a hub 16 for housing a sleeve 17, with bearing 18 arranged therein, to support a drive shaft 20, which has a sprocket gear 21 pinned thereto, and said shaft extending horizontally into bearing 22 mounted in hub portion 25 of arm 9, said arm 9 being provided with a back plate 26 to enclose the arm and form a closed housing.

Secured on the arm 9 is a spring tensioned rod 27, with button 28, said rod assembled with spring 29, bearing 30 and pin 31. The free end of rod 27 fits into aperture 32 in bracket 12 to hold the arm 9 in the desired position during operation of the projector; however permitting pivotal movement of the arm when the end thereof is withdrawn from aperture 32.

The opposite end of said arm 9 supports the driven shaft 35 supported by bearings 36 and 37 within said arm. Said shaft has a sprocket gear 38 pinned thereon to receive the chain 40 driven by gear 21 mounted on shaft 20. One end of the shaft 35 extends outside the arm 9 and has a metal cup shaped flange 41 riveted, or otherwise, secured thereto, said flange having a horizontal, cylindrical portion 42, with external screwthreads 43 on its peripherial surface. Associated with cup shaped flange 42 is a cup shaped flange 45 with vertical wall 46 and cylindrical rim portion 47, said rim portion 47 being provided on its interior with threads 48 for engagement with threads 43 of flange 42 to form an adjustable housing to enclose the yielding mechanism about to be described and which was so greatly expounded in the aforesaid objects.

Enclosed between flanges 41 and 45 is a metallic disc 50 secured to the end of a film reel spindle 51, by riveting or otherwise. Positioned between said disc 50 and spindle 51 is secured a disc 52 forming a shoulder for use with reel 15, said reel 15 being held in desired location upon the spindle 51 by means of spring tensioned ball 53, said parts forming a novel reel mount. Positioned on each side of said disc 50 is an assembly of leather washers or disc-like friction members, 54 and 55. These friction members are saturated with oil and held in close engagement with flanges 41 and 45 as well as disc 50 by adjusting the position of flanges 42 and 47. The disc 50 may be of porous metal capable of retaining oil or other liquids satisfactory for keeping the leather of fiber discs 54 and 55 properly saturated. In the horizontal flange 47 is arranged an oil gun fitting with tension ball valve, said valve to permit oil to be forced inside the housing formed by flanges 41 and 45 when desired; as for example, once a year the leather discs should be suitably saturated. Said oil fitting is designated on the drawing by numeral 58.

The above described mechanism forms a yielding coupling permitting variance of speed and power of the take-up reel spindle 51 dependent upon the instant diameter of the film roll on a radially winding film strip take-up reel driven by the reel spindle, said novel action being accomplished by the slippage of the leather discs 54 and 55 between metal disc 50 and housings 41 and 45, said housings being locked in position by set-screw 59 or some other suitable means. Further said disc 50, being constructed of suitable metal and of desired weight has the characteristics of a floating flywheel which regulates the friction slip of said leather discs as well as the motion of the reel spindle and reel thereon. It is to be noted that the metal discs 50 and 52 secured to spindle 51 are not supported except by the clamping action of housing members 41 and 45; in other words members 50, 51 and 52 are substantially floating. When the reel pull is increased, the force is transmitted to the weighted disc 50 which presses the friction rings 54 and 55 into tighter engagement with said housings 41 and 45. As for example, if the force is downward on spindle 51, this force causes the lower portion of disc 50 to press ring 55 against the lower part of wall 41; likewise, the upper portion of disc 50 presses ring 54 against the top part of wall 46; this action increasing the friction and gives increased power to drive the reel 15. Therefore, as the weight of the reel increases, the friction between the discs and the housing increases, thus providing automatic compensation of power and friction for all sizes and weights of reels.

Although this invention has been described in considerable detail, such description is intended to be illustrative rather than limiting as changes may be readily made without departing from the spirit of the invention, and the scope of the invention is to be determined as claimed.

I claim as my invention:

A film reel drive mechanism of the character described, comprising: a drive shaft; a cup-shaped driving disc mounted on said shaft for rotation therewith; a second cup-shaped driving disc mounted on said first mentioned disc, the flange portions of each disc having complementary threads for assembly of said discs into a housing of adjustable width, a driven disc within said housing, said driven disc being rotatable about the axis of rotation of said shaft and driving discs; annular members of frictional material on opposite sides of said driven disc frictionally coupling said driven disc to said driving discs, said members of frictional material being saturated with a lubricant and said driven disc being of porous metal capable of retaining a lubricant; and a reel spindle having one end mounted on said driven disc for rotation with said driven disc about said axis, said spindle extending through said opening and being spaced from the walls of said opening to permit angular movement of the free end of said spindle to vary said frictional coupling as a function of the weight of a film spool on said spindle.

JOHN J. KUEHN.

REFERENCES CITED

The following references are of record in the file of this patent:

UNITED STATES PATENTS

| Number | Name | Date |
|---|---|---|
| 1,302,701 | Parret | May 6, 1919 |
| 1,365,732 | Schmid et al. | Jan. 18, 1921 |
| 1,920,967 | Carpenter | Aug. 8, 1933 |
| 2,005,096 | Malickson | June 18, 1935 |
| 2,083,646 | Fuller | June 15, 1937 |
| 2,461,033 | Canady | Feb. 8, 1949 |
| 2,472,983 | Nemeth | June 14, 1949 |